Patented June 21, 1949

2,473,920

UNITED STATES PATENT OFFICE 2,473,920

FRACTIONATION OF LINEAR POLYAMIDES AND PRODUCTS OBTAINED THEREBY

Guy B. Taylor, Wilmington, Del., assignor to E. I. du Pont de Nemours & Company, Wilmington, Del., a corporation of Delaware No Drawing. Application July 19, 1944, Serial No. 545,721

3 Claims. (Cl. 260—78)

This invention relates to synthetic polymeric materials, particularly polyamides and more particularly to a process for the fractionation of polyamides.

It is known that synthetic polymers are non-uniform as to molecular weight. Thus, a sample of synthetic linear polymer, e. g., a polyamide prepared as described in U. S. 2,071,250, having an average molecular weight of about 10,000 contains polymers having molecular weights ranging from about 600 to above 100,000. For many purposes, it is desirable that the polymer should be substantially free of the lower molecular weight polymers.

I have found that polyamides can be fractionated by partially precipitating the polymers from solution by the successive addition of non-solvents for the polymers. Thus, a series of fractions in which the polymers have narrower molecular weight distribution ranges are obtained. For this purpose, I have used as solvents for the polyamides, the following materials: phenols, formic acid, acetic acid, hydrochloric acid, mixtures of metal salts with alcohols, for example, calcium chloride and methanol, unsaturated alcohols, mixtures of alcohols and halogenated hydrocarbons and mixtures of the above solvents. As non-solvents for precipitating the polymer fractions, I have used methanol, ethanol, acetone, higher ketones, ethyl acetate and water.

More recently, I have found that mixtures of phenol, water and polyamides form solutions which separate into 1, 2 or 3 phases depending on the composition of the system and the temperature employed. Further, I have found that the various phases contain dissolved polymers having differing molecular weight distribution ranges.

This invention has as an object the production of polymeric materials characterized by high uniformity in molecular weight. Other objects will appear hereinafter.

The above objects are accomplished by the methods more particularly described hereinafter which involve the fractionation of polyamides by means of a multiple phase system comprising phenol, water and polyamide.

Twenty-eight and five-tenths parts of polyhexamethylene adipamide having a viscosity of 77 centipoises (10% solution in formic acid) was dissolved in 533 parts of 88% phenol and 438.5 parts of distilled water was then added. The solution was placed in a water bath maintained at 60° C. and stirred until equilibrium was established. Agitation was then discontinued and the phases permitted to separate. Samples of the various phases were removed for analyses for phenol and polyamide. The polymers were recovered from the phenol solution of the separated phases by precipitation into large volumes of ethyl acetate and the polymers were characterized by determining the viscosity of 10% solutions of the polymers in 90% technical formic acid. The results are shown in column 1 of the accompanying table. Quantities of phenol and water as shown at the bottom of column 1 of the table and corresponding approximately to the samples withdrawn were added to the remaining solutions and the process repeated as shown in column 2 of the table. The process was repeated for five more times as shown in columns 3, 4, 5, 6 and 7 of the table.

Table

| Fractionation | 1 | 2 | 3 | 4 | 5 | 6 | 7 |
|---|---|---|---|---|---|---|---|
| Weight of Solution, parts: | | | | | | | |
| Top Phase | 200 | 300 | 250 | 200 | 200 | 30 | 30 |
| Middle Phase | 400 | 350 | 350 | 450 | 600 | 850 | 850 |
| Bottom Phase | 400 | 350 | 325 | 300 | 200 | 40 | 40 |
| Solution Removed, parts: | | | | | | | |
| Top Phase | 0 | 0 | 0 | 52 | 84 | 0 | 0 |
| Middle Phase | 262 | 281 | 268 | 350 | 470 | 770 | 784 |
| Bottom Phase | 0 | 0 | 0 | 78 | 160 | 0 | 37 |
| Composition, Per Cent: | | | | | | | |
| Top Phase— | | | | | | | |
| Phenol | | | | 16.2 | 16.5 | | |
| Polymer | | | | 0 | 0 | | |
| Middle Phase— | | | | | | | |
| Phenol | 57 | 57 | 56.2 | 56.3 | | | 53 |
| Polymer | 0.74 | 0.55 | 0.48 | 0.37 | 0.30 | 0.126 | 0.10 |
| Bottom Phase— | | | | | | | |
| Phenol | | | | 63 | 65.2 | | 66.5 |
| Polymer | | | | 6.7 | 6.85 | | 6.8 |
| Per Cent of Total Polymer in Middle Phase | 10.4 | 6.8 | 5.9 | 5.7 | 6.3 | 3.8 | 3.0 |
| Per Cent of Total Polymer Removed (Middle Phase) | 6.8 | 5.4 | 4.5 | 4.5 | 4.9 | 3.4 | 2.8 |
| Viscosity of Polymer, Centipoises: | | | | | | | |
| Middle Phase | 20.5 | 22 | 14 | 16.5 | 15.5 | 37.4 | 53 |
| Bottom Phase | | | | 97 | 110 | | 161 |
| Solvent Added After Separation, parts: | | | | | | | |
| Phenol | 138 | 160 | 215 | 270 | 452 | 452 | |
| Water | 112 | 100 | 100 | 170 | 250 | 300 | |

It is noted that polymer is a component of only two of the three phases, namely, of the second and bottom layers or phases, and that the polymer recovered from the richer (lower phase) has a greater solution viscosity than that from the poorer (middle phase). It is further noted that the polymer from the lower phase had a greater solution viscosity and that the polymer from the middle phase a lower viscosity than the original. The data in the table indicate that the middle phase resulting from the first extraction contains 10.4% of the total polymers originally dissolved in the phenol. This polymer had a viscosity of 20.5 centipoises (10% by weight in formic acid) as compared to a viscosity of 77 centipoises for the original polymer. The data indicate, also, that after approximately 25% of the total polymer is removed, that substantially all of the relatively low molecular weight polymer has been removed since the viscosity of the polymer contained in the middle phase rapidly increases as a result of additional fractionation. Referring more particularly to the data given under the first fractionation in the table it will be seen that the top phase (or layer) consisted of approximately 200 parts, the middle phase approximately 400 parts and the bottom phase 400 parts. Two hundred sixty-two parts (approximately 85% of the middle phase) of solution was then removed from the middle phase and a portion analyzed. This phase was found to consist of 57% phenol, 0.74% polymer and 42.26% water (by difference). The middle phase contained 10.4% of the total polymer originally dissolved in the phenol. Of the polymer originally dissolved, only 6.8% was removed because only 262 parts of the 400 parts of solution was removed. The polymer in solution in the middle phase was found to have a viscosity of 20.5 centipoises compared to a viscosity of 77 centipoises for the original polymer. These data show that the lower molecular weight polymer is contained in the middle phase. The viscosity data in columns 4, 5 and 7 indicate that the higher molecular weight polymer is present in the lower phase. A mixture of phenol and water corresponding approximately in composition and amount is then added to the remaining nylon-phenol-water solution and the process repeated to give the results as indicated under column 2.

The further systematic fractionation of polyhexamethylene adipamide was carried out using the general procedure outlined above. Six extractions were made to remove 40% of the polymer. This 40% was then separated into three other fractions, the four resulting fractions had viscosities (10% by weight in formic acid) of 95, 31.5, 23 and 19 centipoises compared with the value of 52.8 for the original polymer. The fractions obtained contained 58.5, 13.5, 8.5 and 6.5% of the original polymer.

Although the invention is illustrated by the fractionation of polyhexamethylene adipamide, it is applicable to polyamides of the type described in U. S. 2,071,250, 2,071,253 and 2,130,948. The polyamides of this kind, generally speaking, comprise the reaction product of a linear polymer-forming composition containing amide-forming groups, for example, reacting materials consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equivalent amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactions have a unit length of at least 7 where "unit length" is defined as in U. S. Patent 2,071,253 and 2,130,948. The average number of carbon atoms separating the amide groups in these polyamides is at least two.

These linear polyamides include also polymers, as for instance the polyester-amides obtained by admixture of other linear polymer-forming reactants as for instance glycol-dibasic acid mixtures or hydroxy acids, with the mentioned polyamide-forming reactants. Both the simple and modified linear polyamides contain the recurring amide groups:

in which X is oxygen or sulfur and R is hydrogen or a monovalent hydrocarbon radical, as an integral part of a main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acids, and the amino alcohol-dibasic acid polymer yield the amino alcohol hydrochloride and the dibasic carboxylic acid.

In carrying out the fractionation of polyamides using a mixture of water and phenol, the concentration of polymer in the solvents is generally within the range of 1 to 15% although higher concentrations up to 20% are feasible although very viscous solutions are generally obtained where solutions of high concentration are employed. In general, the ratio of water to phenol is within the range of 30 to 55% of water and 70 to 45% of phenol.

The fractionation of the polyamide using phenol water solutions is usually carried out within the range of 56 to 95° C. At higher temperatures, for example, from 70 to 95° C., two phase systems are obtained, both of which contain polymer. The upper layer containing the lower molecular weight material whereas the lower phase contains the higher molecular weight polymers. For best results, temperatures within the range of 56 to 75° are employed.

The products of this invention are useful for a variety of purposes. Thus, the high molecular weight polymers are advantageously used for spinning fibers and casting films from solutions. They may also be melt-spun into fibers and bristles. The lower molecular weight polymers are particularly suitable for use in the preparation of molded objects, and for the coating of fabrics.

As many apparently widely different embodiments of this invention may be made without departing from the spirit and scope thereof, it is to be understood that I do not limit myself to the specific embodiments thereof except as defined in the appended claims.

I claim:

1. A process which comprises agitating a solution of from 1 to 20 parts of polyamide in a mixture of from 45 to 70 parts phenol and from 30 to 55 parts water, allowing the liquid menstruum to separate into a plurality of layers while maintaining the solution within the temperature range of 56 to 95° C., separating at least a portion of one of said layers, and isolating the polyamide from said layer, said polyamide being a synthetic linear polycarbonamide in which the recurring amide groups are an integral part of the main polymer chain and in which the average number of carbon atoms in the segments of the chain separating the amide groups is at least two.

2. A process which comprises agitating a solution of from 1 to 20 parts of polyamide in a mixture of from 45 to 70 parts phenol and from 30 to 55 parts water, allowing the liquid menstruum to separate into a plurality of layers while maintaining the solution within the temperature range of 56 to 95° C., separating the bottom layer and isolating the polyamide therefrom, said polyamide being a synthetic linear polycarbonamide in which the recurring amide groups are an integral part of the main polymer chain and in which the average number of carbon atoms in the segments of the chain separating the amide groups is at least two.

3. A process which comprises agitating a solution of approximately 1 part of polyhexamethylene adipamide in a mixture of about 18.4 parts of phenol and 15.4 parts of water, allowing the liquid menstruum to separate into a plurality of layers while maintaining the solution at about 60° C., separating at least a portion of one of said layers, and isolating the polyhexamethylene adipamide from said layer.

GUY B. TAYLOR.

REFERENCES CITED

The following references are of record in the file of this patent:

UNITED STATES PATENTS

| Number | Name | Date |
|---|---|---|
| 2,099,513 | DeSimo et al. | Nov. 16, 1937 |
| 2,255,388 | Kunc | Sept. 9, 1941 |

FOREIGN PATENTS

| Number | Country | Date |
|---|---|---|
| 397,909 | Great Britain | Sept. 4, 1933 |
| 542,128 | Great Britain | Dec. 29, 1941 |